UNITED STATES PATENT OFFICE.

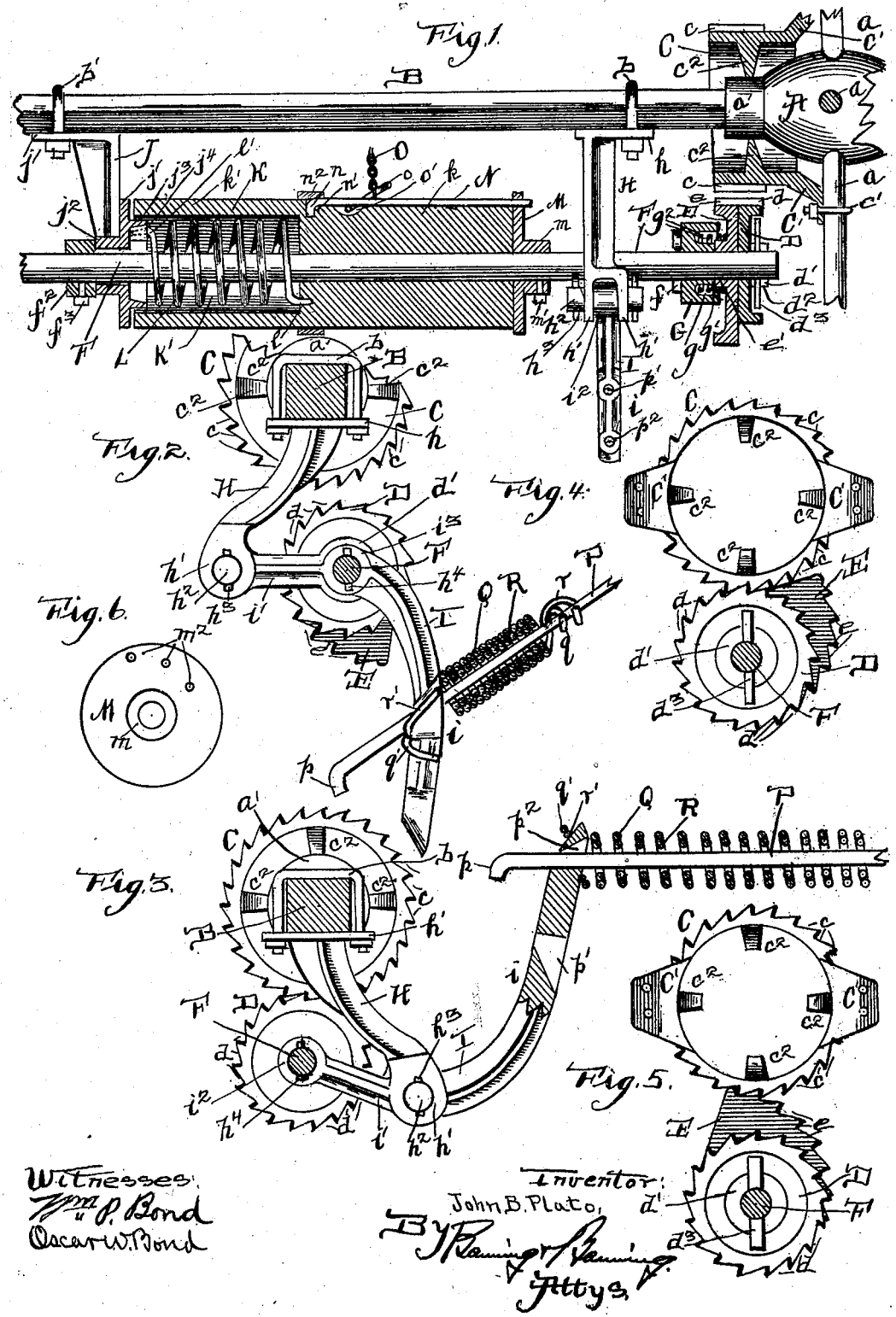

JOHN B. PLATO, OF DENVER, COLORADO.

HORSE-HITCHING DEVICE.

No. 823,964.      Specification of Letters Patent.      Patented June 19, 1906.

Application filed June 21, 1905. Serial No. 266,277.

*To all whom it may concern:*

Be it known that I, JOHN B. PLATO, a citizen of the United States, residing at Denver, in the county of Denver and State of Colorado, have invented a certain new and useful Improvement in Horse-Hitching Devices, of which the following is a specification.

This invention relates to that type of horse-hitching devices which are applied or attached to a wagon, truck, carriage, or other vehicle for horses; and has for its object to construct a device which will be automatic and positive in its action on the reins, whether the horse is advancing or backing; to apply one member of the hitching device fixedly to the wheel so as to revolve therewith and suspend the other member of the device from the axle in such manner as that it can be brought into coacting relation with the wheel member of the device by the driver; to construct the wheel member of the device in the shape of an annular rim having peripheral or circumferential teeth of a ratchet shape to coact with similar teeth on a wheel applied to a cross rod or shaft and having the annular rim to coact also with a segment or wing having an eccentric periphery with ratchet-shaped teeth thereon and loosely mounted on the cross rod or shaft; to furnish a frictional contact between the wheel on the cross-rod and the segment or wing by which the rotation of the wheel will carry around the segment or wing into position for the teeth thereon to engage the teeth of the wheel-rim; to force the segment or wing into frictional engagement with the adjacent wheel by means of a collar on the shaft and a spring between the collar and the segment or wing; to support the cross-rod in hangers connected with or attached to the axle, one of the hangers consisting of two parts, one of which is movable and carries the bearing for the cross rod or shaft and furnishes a connection for a draw-rod and spring by means of which the wheel on the cross rod or shaft has its ratchet-teeth brought into engagement with the ratchet-teeth on the rim attached to the wheel-spokes for revolving the cross rod or shaft direct from the travel or revolving of the wheel of the wagon or other vehicle; to fixedly mount a drum on the cross rod or shaft, which drum is under spring tension, so that the turning of the drum to wind the lines will apply tension to the spring, and with the release of the winding power for the drum the tension of the spring will return the drum to normal position and release the draw on the reins; to connect the drum with the cross rod or shaft by an end plate, a bar set into the periphery of the drum, and a band slidable on the drum and fixedly retaining one end of the bar in engagement with the drum, the bar of the drum having connected thereto a chain or other flexible connection for attachment to the reins, and to improve generally the construction and arrangement of the several elements which enter into the formation of the horse-hitching device as a whole.

The invention consists in the features of construction and combination of parts hereinafter described and claimed.

In the drawings, Figure 1 is a side elevation, partly in section, of the hitching device of the invention; Fig. 2, an end elevation, partly in section, showing the supporting-arm of one of the brackets with a downward projection; Fig. 3, a similar view to Fig. 2, showing the supporting-arm of one of the brackets with an upward projection; Fig. 4, a face view of the rim on the wheel and the ratchet-wheel on the cross rod or shaft, showing the two in engagement for revolving the drum and winding the chain or flexible connection onto the drum to draw the reins or pull-back strap taut; Fig. 5, a similar view to Fig. 4, showing the eccentric wing or segment in engagement with the rim attached to the wheel for releasing the rim of the wheel from its engagement with the ratchet-wheel of the cross-rod to allow the drum to reversely revolve and relieve the draw on the reins or pull-back strap; and Fig. 6, a face view of the plate or disk for connecting one end of the winding-drum with the cross-rod.

A complete wheel is not shown, as the device can be applied to wheels of ordinary construction having a hub A with spokes *a*, and, as shown, with a hub extension *a'* on the inner end, and the wheel is attached to an axle B in any usual and well-known manner, the axle preferably being square in cross-section, but can be of other shape.

The annular rim C, of metal, has on its periphery or circumference teeth *c*, of a ratchet form or shape in the arrangement shown, and this rim has ears or plates C', by means of which and clips or stirrups *c'* the annular rim is attached to the spokes *a* of the wheel, as shown in Fig. 1, and, as shown, inwardly extending from the annular rim C are projections or studs $c^2$, which encircle the hub extension $a'$ and furnish a guide for correctly attaching the annular rim to the wheel.

A wheel or disk D, having on its periphery ratchet-shaped teeth $d$ corresponding in shape to the teeth of the annular rim, is attached to a cross rod or shaft by means of a hub $d'$, having a cross-slot $d^2$, through which and the end of the cross rod or shaft a pin $d^3$ passes, fixedly mounting the wheel or disk on the cross rod or shaft. A segment or wing E, having an eccentric periphery provided with ratchet-teeth $e$, corresponding in shape to the teeth on the annular rim, is loosely mounted on the cross rod or shaft, with its face in bearing contact with the face of the wheel or disk D, so that the revolving of the wheel or disk D will by the frictional engagement between the wheel or disk and the segment or wing revolve the segment or wing. The cross rod or shaft F is of the proper diameter in cross-section to resist torsion and strain in use, and this rod or shaft has the wheel or disk D fixedly connected therewith and the segment or wing E loosely mounted thereon. A cap G is loosely mounted on the cross rod or shaft F, and has an annular groove $g$ therein, furnishing a hub or center $g'$, which abuts against the hub or center $e'$ of the segment or wing when the parts are assembled as shown in Fig. 1, and in the recess or channel $g$ of the cap G is located a coil-spring $g^2$, which encircles the hubs $g'$ and $e'$ and furnishes the necessary force to hold the segment or wing E in frictional engagement with the wheel or disk D for the revolving of the wheel or disk to turn the segment or wing. The cap or collar G is held against end movement in one direction by a pin $f$, passing through the cross rod or shaft F, and against which the end face of the cap or collar abuts, so that the spring $g^2$ can act and maintain the proper frictional engagement between the wheel or disk and the segment or wing.

A bracket H, having at its upper end a plate or ear $h$, is attached to the axle B by a stirrup or clip $b$, so as to have a fixed and permanent relation. The lower end of the bracket H has a fork $h'$, between which is mounted a movable arm, constituting one of the supports for the cross shaft or rod. This arm I has a curved portion $i$ and a straight portion $i'$, and in one form of arrangement, that shown in Fig. 2, the curved portion $i$ has a downward projection, while in the arrangement shown in Fig. 3 the curved portion $i$ has an upward projection. The arm I has at the end of the straight portion $i'$ a bearing or head $i^2$, and at the juncture of the curved and straight portions the arm I has a bearing or head $i^3$, and with the arrangement shown in Fig. 2 the arm I is pivotally mounted between the fork $h'$ of the bracket $h$ by a pin or pivot $h^2$, passing through the fork and the head or bearing $i^2$ of the arm, and the pin or pivot is held in place against unlimited end movement by cross-pins $h^3$, passing through the pin or pivot at each end thereof, as shown in Figs. 1, 2, and 3. The arm I in the arrangement of Fig. 2 is pivotally mounted on the cross rod or shaft F, which passes through the bearing or head $i^3$, and is held against side play or movement on the shaft by pins $h^4$, passing through the cross rod or shaft adjacent to the bearing or head $i^3$ of the arm. The arm I in the arrangement of Fig. 2 swings from the pivotal connection to the bracket H, so that the wheel or disk D and the eccentric segment or wing E can be raised and lowered, as required for use. The arrangement shown in Fig. 3 has the arm I pivotally mounted in the fork $h'$ of the bracket H by means of the pin or pivot $h^2$, which passes through the fork $h'$ and through the bearing or head $i^3$ of the arm, and in this arrangement the cross shaft or rod F is mounted in the bearing or head $i^2$ of the arm I and is held against lateral or end play by the cross-pins $h^4$, passing through the rod or shaft adjacent to the bearing or head $i^2$ of the arm, the pin or pivot $h^2$ being held against unlimited end play by cross-pins $h^3$, as in the construction shown in Fig. 2. The arm I is reversible and can be made to have an upward projection or a downward projection by simply changing its point of pivot to the bracket H, the same pivot or pin $h^2$ serving in either position of the arm.

A bracket J, having at its upper end a plate or ear $j$, is attached to the axle B by stirrups or clips $b'$, so as to have a fixed relation on the axle, and this bracket has a side plate $j'$ with a bearing or head $j^2$, through which the cross shaft or rod F passes with sufficient play to allow of the rising-and-falling movement at the end of the shaft or rod carrying the wheel or disk D and the segment or wing E for the engagement of the wheel or disk and the segment or wing with the annular rim attached to the spokes of the wheel. The shaft or rod F has thereon a collar $f^2$, which abuts against the end of the bearing or box $j^2$ and is locked to the shaft by a set-screw $f^3$ and holds the shaft or rod against end movement in one direction. It will be seen that the shaft or rod is mounted or supported by the bracket J, the bracket H, and the arm I, so that it is free to rise and fall at the end, having thereon the disk or wheel D and the segment or wing E and allow the disk or wheel and the segment to be dropped out of engagement with the annular rim or to be raised into engagement with the annular rim and when engaged have the rotation of the annular rim revolve the rod or shaft F in its bearings.

A drum K, preferably made of wood, is mounted on the shaft or rod F, and this drum has one section or portion $k$ with a solid body having a hole for the passage of the shaft or rod and has another portion $k'$ with a chamber $K'$ therein. A coil-spring L is located in the chamber $K'$ of the drum, and one end $l$ of this spring is fixedly attached to the solid section or portion $k$ of the drum, while the other end $l'$ of the spring engages with a catch $j^4$ on a rim $j^3$ of the plate $j'$, so that with the turning of the shaft and the drum in a winding direction the spring will be placed under a tension sufficient to act with the release of the winding power and return the drum to normal position automatically. A plate M, having a hub $m$, abuts against the end of the drum K, and this plate is fixedly attached to the shaft or rod F by a set-screw $m'$, passing through the hub $m$ thereof. The plate M has in its body a plurality of holes $m^2$, arranged on a circle eccentric to the circumference of the plate, as shown in Fig. 6, and one end of a rod N is inserted in the proper hole $m^2$ for the diameter of the drum K, so that the rod N can be inserted in the proper hole $m^2$ for the diameter of the drum K, so that the rod N can be inserted in a groove of the drum and be held in such groove, and the other end of the rod is turned to form a projection $n$, which enters a hole $n'$ in the drum, and when entered a band $n^2$ is slipped over the end of the rod, firmly securing the rod N in position on the drum between the plate M and the band $n^2$, so that with the revolving of the shaft or rod F the plate M will be revolved and carry with it the drum. A chain O is attached in the arrangement shown to a ring $o$ on the rod or bar N, and, as shown, the drum is cut away to form a recess or depression $o'$, in which the ring is located and free to turn or swing on the rod or bar M and cause the chain O to be wound on and allow the chain O to be unwound from the drum. The chain is to be attached to the reins or to an independent draw or pull strap leading from the bits, so that when it is wound onto the drum it will draw the reins or strap taut and when unwound from the drum it will allow the reins or strap to slack.

A rod P, having a turned end $p$ to form a stop, is connected with the arm I, and, as shown, the connection is by means of an outer coil-spring Q and an inner coil-spring R, the end $q$ of the spring Q being fixedly attached to the rod P and the end $r$ of the spring R being likewise fixedly attached to the rod P, and the end $q'$ of the spring Q is hooked over the arm I, and the end $r'$ of the spring is also hooked over the arm I, so that a yieldable connection is furnished for the draw-rod P with the arm I, which will prevent undue strain or sudden engagement of the ratchet-wheels from the injury or breaking of parts. The rod P in the construction and arrangement shown in Fig. 2 is entered through a slot $p'$ in the body of the arm I, so that the rod P has an upward inclination leading to a high seat for the driver, and the arrangement of Fig. 2 is designed more particularly for the use of the hitch with a wagon, truck, or other vehicle having a high or raised seat and short box and in which the front wheels cut under. The rod P in the construction and arrangement shown in Fig. 3 is entered through a slot $p^2$ in the body of the arm I, so that the rod P extends in approximately a straight line to the driver, and this arrangement of Fig. 3 is designed more especially for use with express-wagons, trucks, and other vehicles having a long box with the seat not raised.

The operation will be understood from the foregoing description, but briefly is as follows: When the horse or team is to be hitched, the driver by drawing on the rod P through the connecting-springs Q and R moves the arm I so as to raise the free end of the shaft or rod F into position for the teeth of the disk or wheel D to be in engagement with the teeth of the annular rim C, and with the gear thus connected any attempt of the horse or team to travel forward will through the forward rotation of the spokes of the wheel cause the teeth of the annular rim and the teeth of the disk or wheel by their engagement to revolve the disk or wheel D, and with it the rod or shaft F, turning the drum K in the direction to wind the chain O thereon and draw the reins or pull strap taut, at once checking the horse or team by this draw on the reins or strap and causing the horse or team to stop. The revolving of the wheel or disk D carries with it the segment or wing E until the edge of the segment or wing strikes the annular rim, as shown in Fig. 4, limiting the turning of the segment or wing in that direction. An attempt of the horse or team to back gives a reverse rotation to the annular rim C, and with this reverse rotation the frictional contact between the teeth of the annular rim and the wheel or disk D is sufficient to give a reverse rotation to the wheel or disk, and such reverse rotation of the wheel or disk D through the frictional engagement between the wheel or disk and the segment or wing E carries the wing around until the teeth on its periphery or edge come into engagement with the teeth of the rim, when the segment or wing will be turned and with such turning, owing to the eccentricity of its toothed edge, the shaft or rod F will be forced down, carrying the wheel or disk D out of engagement with the annular rim and allowing the spring L to act and reverse the travel of the drum K, unwinding the chain O from the drum and giving a slack rein for the horse or team, which will stop the backing of the horse or team. A forward movement of the horse or team will again bring the annular rim and the wheel or disk into engagement and wind the chain O on the drum and draw the reins taut, as when the segment or wing passes from the annular rim the springs Q and R act and throw the wheel and shaft-gear into engagement. It will thus be seen that the movement of the team controls the hitch, as with the forward movement the drum is turned to draw the reins or strap taut and with a backward movement the drum is released to allow the reins or strap to slack, with the result that the control of the hitch is automatic with the forward or backward movement of the horse or team alone after the driver has once set the gear into engagement. The springs Q and R allow of the necessary yield for the eccentric wing or segment to force down the shaft or rod F and release the engagement between the annular rim and the wheel or disk D, and the tension of the spring is sufficient to return the rod or shaft into position to engage the wheel or disk D and the annular rim when the eccentric segment or wing passes the point of contact with the annular rim. The hitching device will serve as a safeguard against a runaway, as in case a horse or team starts to run the driver can through the rod P and its yielding connection raise the shaft or rod F and engage the wheel or disk D with the annular rim C, revolving the shaft and turning the drum to draw the reins taut and at once check the horse or team, and in so operating the hitching device the yieldable connection between the lifting-arm and the pull or draw rod will prevent any injurious effects in engaging the wheel or disk of the shaft with the annular rim of the wheel.

What I claim as new, and desire to secure by Letters Patent, is—

1. In a horse-hitching device, the combination of a toothed rim attached to the wheel-spokes, a toothed wheel adapted to be brought into engagement with the toothed rim, a toothed eccentric segment adjacent to and in frictional engagement with the toothed wheel and adapted to be brought into engagement with the toothed rim, a rising-and-falling shaft carrying the toothed wheel and the toothed segment, and a drum mounted on the shaft, substantially as described.

2. In a horse-hitching device, the combination of a toothed rim attached to the wheel-spokes, a toothed wheel adapted to be brought into engagement with the toothed rim, a toothed eccentric segment adjacent to and in frictional engagement with the toothed wheel and adapted to be brought into engagement with the toothed rim, a rising-and-falling shaft carrying the toothed wheel and the toothed segment, a bracket attached to the axle, an arm pivotally mounted in the bracket and supporting the shaft, a second bracket attached to the axle and through which the shaft passes, and a drum mounted on the shaft, substantially as described.

3. In a horse-hitching device, the combination of a toothed rim attached to the wheel-spokes, a toothed wheel adapted to be brought into engagement with the toothed rim, a toothed eccentric segment adjacent to and in frictional engagement with the toothed wheel and adapted to be brought into engagement with the toothed rim, a rising-and-falling shaft carrying the toothed wheel and the toothed segment, a bracket attached to the axle, an arm pivotally mounted in the bracket and supporting the shaft, a second bracket attached to the axle and through which the shaft passes, a drum mounted on the shaft, a spring within the drum and connected at one end to the drum and at the other end to a fixed point for returning the drum to normal position, substantially as described.

4. In a horse-hitching device, the combination of a toothed rim attached to the wheel-spokes, a toothed wheel adapted to be brought into engagement with the toothed rim, a toothed eccentric segment adjacent to and in frictional engagement with the toothed wheel and adapted to be brought into engagement with the toothed rim, a rising-and-falling shaft carrying the toothed wheel and the toothed segment, a bracket attached to the axle, an arm pivotally mounted in the bracket and supporting the shaft, a second bracket attached to the axle and through which the shaft passes, a drum mounted on the shaft, a pull-rod for the pivotally-mounted arm, and a spring connection between the pull-rod and the arm, substantially as described.

5. In a horse-hitching device, the combination of a shaft having a rising-and-falling movement, driving means on the shaft adapted to be driven from the vehicle-wheels, an arm pivotally mounted and supporting the shaft, a winding-drum on the shaft, a pull-rod for the pivotally-mounted arm, and a yieldable connection between the pull-rod and the arm, substantially as described.

6. In a horse-hitching device, the combination of a toothed rim attached to the wheel-spokes, a toothed wheel adapted to be brought into engagement with the toothed rim, a toothed eccentric segment adjacent to and in frictional engagement with the toothed wheel and adapted to be brought into engagement with the toothed rim, a rising-and-falling shaft carrying the toothed wheel and the toothed segment, a drum mounted on the shaft, and a flexible connection attached to the drum and winding on and unwinding from the drum and adapted for attachment to the reins, substantially as described.

7. In a horse-hitching device, the combination of a toothed driver attached direct to the spokes of a wheel, a shaft suspended from the axle and having a rising-and-falling movement at one end, a toothed eccentric segment attached to the rising-and-falling end of the shaft for engagement with the toothed driver, a drum mounted on the shaft and a spring within the drum for reversing the revolution of the drum, substantially as described.

8. In a horse-hitching device, the combination of a toothed driver attached direct to the spokes of a wheel, a shaft suspended from the axle by a reversible bracket and arm and having a rising-and-falling movement at one end, a toothed wheel on the rising-and-falling end of the shaft, a toothed eccentric segment on the rising-and-falling end of the shaft, a collar on the shaft, a spring carried by the collar and holding the eccentric segment in frictional engagement with the toothed wheel, a winding-drum mounted on the shaft, and a spring within the winding-drum, substantially as described.

9. In a horse-hitching device, the combination of a driver, a shaft suspended from the axle and having a rising-and-falling movement at one end, a reversible arm carrying the shaft, driving means for the shaft actuated from the driver, and a pull connected with the reversible arm, substantially as described.

JOHN B. PLATO.

Witnesses:
OSCAR W. BOND,
WM. P. BOND.